United States Patent
Kogano

(10) Patent No.: US 11,494,674 B2
(45) Date of Patent: Nov. 8, 2022

(54) DRIVING ACTION EVALUATING DEVICE, DRIVING ACTION EVALUATING METHOD, AND RECORDING MEDIUM STORING DRIVING ACTION EVALUATING PROGRAM

(71) Applicant: TOYOTA JIDOSHA KABUSHIKI KAISHA, Toyota (JP)

(72) Inventor: Gentaro Kogano, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 16/912,274

(22) Filed: Jun. 25, 2020

(65) Prior Publication Data

US 2021/0042642 A1   Feb. 11, 2021

(30) Foreign Application Priority Data

Aug. 8, 2019   (JP) .............................. JP2019-146809

(51) Int. Cl.
| | |
|---|---|
| *G06N 5/04* | (2006.01) |
| *G07C 5/00* | (2006.01) |
| *G07C 5/08* | (2006.01) |
| *G06N 20/00* | (2019.01) |
| *G06V 20/56* | (2022.01) |

(52) U.S. Cl.
CPC .............. *G06N 5/04* (2013.01); *G06N 20/00* (2019.01); *G06V 20/56* (2022.01); *G07C 5/008* (2013.01); *G07C 5/085* (2013.01)

(58) Field of Classification Search
CPC .......... G06N 5/04; G06N 20/00; G06V 20/56; G07C 5/085; G06K 9/6262; G08G 1/00; B60W 40/09
See application file for complete search history.

(56) References Cited

U.S. PATENT DOCUMENTS

2015/0006132 A1 * 1/2015 Matsumura ...... G08G 1/096791
703/2

FOREIGN PATENT DOCUMENTS

| CN | 104054117 A | 9/2014 |
|---|---|---|
| JP | 2013-149154 A | 8/2013 |
| JP | 2014-135061 A | 7/2014 |
| JP | 2015-125560 A | 7/2015 |
| JP | 2018-135058 A | 8/2018 |

* cited by examiner

*Primary Examiner* — Manuel A Rivera Vargas
(74) *Attorney, Agent, or Firm* — Sughrue Mion, PLLC

(57) ABSTRACT

A driving action evaluating device that specifies a driving scene by using at least one of an image captured by an onboard camera and position information of an own vehicle; and derives an evaluation of driving actions by executing an evaluation logic, which corresponds to only a driving scene specified by the specifying section, among a plurality of evaluation logics that correspond to a plurality of driving scenes, respectively.

12 Claims, 8 Drawing Sheets

FIG. 3

| DRIVING SCENE | DATE/TIME | VEHICLE BEHAVIOR RELATED DATA 32 | | | | | | |
|---|---|---|---|---|---|---|---|---|
| | | VEHICLE SPEED | OPERATED AMOUNT OF ACCELERATOR PEDAL | OPERATED AMOUNT OF BRAKE PEDAL | STEERING WHEEL STEERING ANGLE | VEHICLE ANGULAR VELOCITY | ACCELERATION IN LATERAL DIRECTION | ACCELERATION IN LONGITUDINAL DIRECTION |
| TEMPORARY STOPPING | 2019/07/01 10:00:00 | S1 | A1 | B1 | C1 | D1 | E1 | F1 |
| | 2019/07/01 10:00:01 | S2 | A2 | B2 | C2 | D2 | E2 | F2 |
| | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |

DRIVING ACTION EVALUATING DEVICE, DRIVING ACTION EVALUATING METHOD, AND RECORDING MEDIUM STORING DRIVING ACTION EVALUATING PROGRAM

CROSS-REFERENCE TO RELATED APPLICATION

This application is based on and claims priority under 35 USC 119 from Japanese Patent Application No. 2019-146809 filed on Aug. 8, 2019, the disclosure of which is incorporated by reference herein.

BACKGROUND

Technical Field

The present disclosure relates to a driving action evaluating device, a driving action evaluating method and a recording medium storing a driving action evaluating program that evaluate driving actions of a vehicle.

Related Art

Japanese Patent Application Laid-Open (JP-A) No. 2015-125560 discloses a technique of deriving an evaluation of driving actions of a vehicle from a traveling state of an own vehicle from the time that the own vehicle approaches an intersection until the time that the own vehicle passes-through the intersection.

However, the technique disclosed in JP-A No. 2015-125560 derives an evaluation of driving actions in a specific driving scene that is from approaching an intersection until passing therethrough, but, in an actual environment of traveling, various scenes can be supposed. Usually, in a vehicle having an advanced drive assist system or an automatic driving system, the processings of evaluating of the driving actions of the driver (including processing for judging whether or not drive assist is to be carried out) must always be executed in parallel for various types of driving scenes. In such a case, the load of the computational processing becomes high, and there is room for improvement with regard to the point of efficiently carrying out evaluation of driving actions.

SUMMARY

An aspect of the disclosure is a driving action evaluating device that includes: a specifying section that specifies a driving scene by using at least one of an image captured by an onboard camera and position information of an own vehicle; and a deriving section that derives an evaluation of driving actions by executing an evaluation logic, which corresponds to only a driving scene specified by the specifying section, among a plurality of evaluation logics that correspond to a plurality of driving scenes, respectively.

BRIEF DESCRIPTION OF THE DRAWINGS

FIG. 3 is a drawing showing an example of data for learning.

DETAILED DESCRIPTION

An embodiment of the present disclosure is described in detail hereinafter with reference to the drawings.

Figure 1:
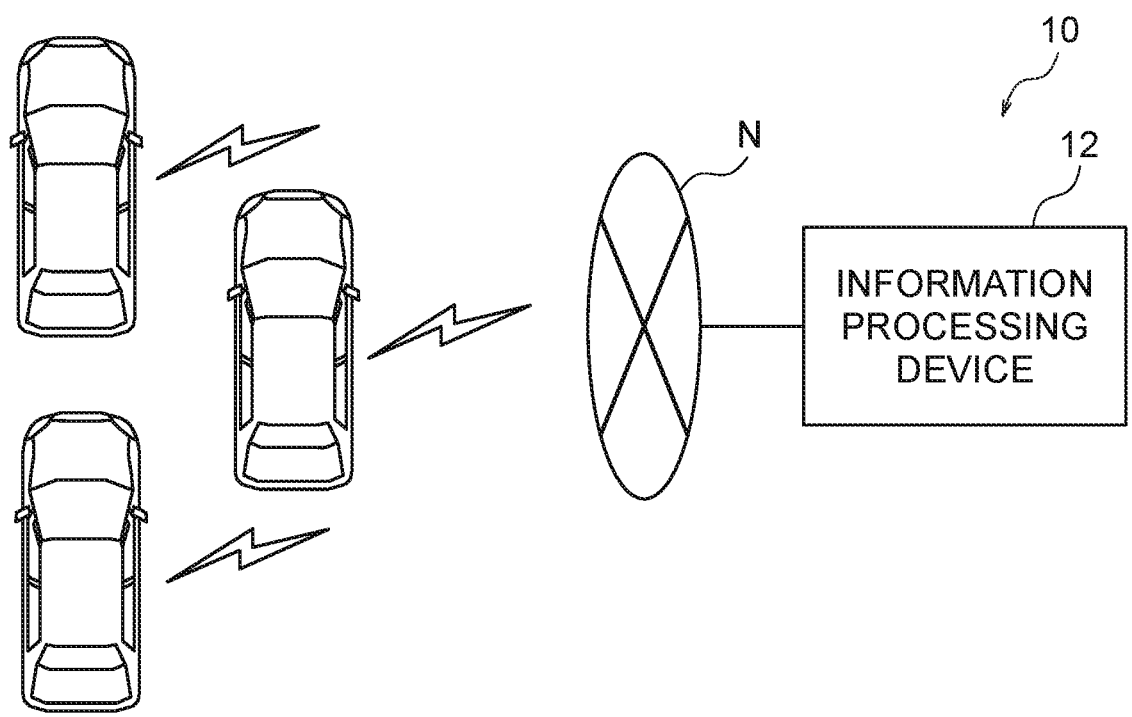
FIG. 1 is a block drawing showing an example of the structure of a driving action evaluating system.

First, the structure of a driving action evaluating system 10 relating to the present embodiment is described with reference to FIG. 1. As shown in FIG. 1, the driving action evaluating system 10 includes an information processing device 12 that is connected to a network N such as the internet or the like. The information processing device 12 can transmit and receive information to and from plural vehicles respectively via the network N. The respective vehicles are connected to the network N by wireless communication for example. A server computer is an example of the information processing device 12.

Figure 2:
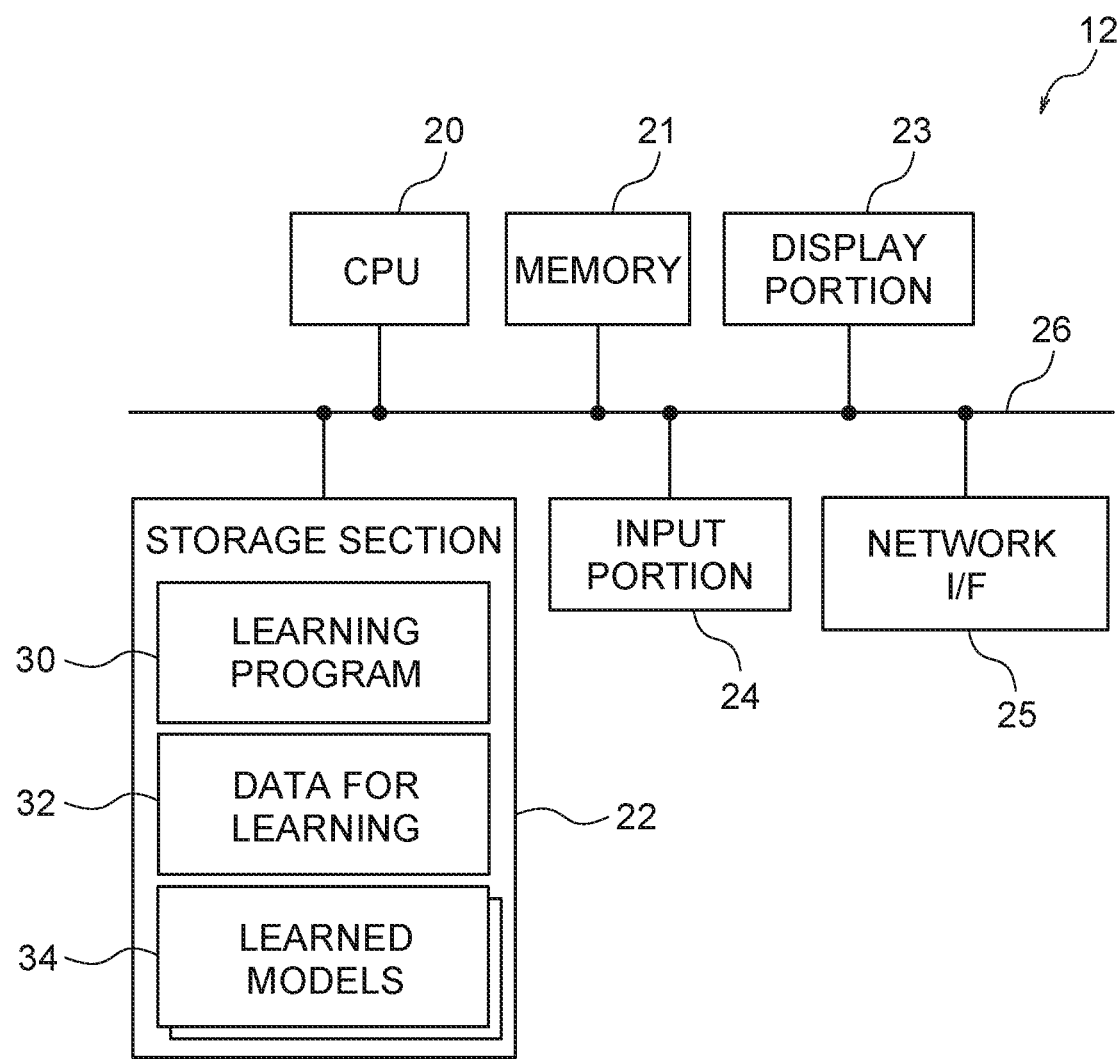
FIG. 2 is a block drawing showing an example of hardware structures of an information processing device.

Next, the hardware structures of the information processing device 12 relating to the present embodiment are described with reference to FIG. 2. As shown in FIG. 2, the information processing device 12 includes a CPU (Central Processing Unit) 20, a memory 21 that serves as a temporary storage region, and a non-volatile storage section 22. Further, the information processing device 12 includes a display portion 23 such as a liquid crystal display or the like, an input portion 24 such as a keyboard and a mouse or the like, and a network I/F (InterFace) 25 that is connected to the network N. The CPU 20, the memory 21, the storage section 22, the display portion 23, the input portion 24 and the network I/F 25 are connected to a bus 26.

The storage section 22 is realized by an HDD (Hard Disk Drive), an SSD (Solid State Drive), a flash memory, or the like. A learning program 30 is stored in the storage section 22 that is a non-transitory storage medium. The CPU 20 reads-out the learning program 30 from the storage section 22, and expands the program in the memory 21, and loads and executes the expanded learning program 30. Further, data 32 for learning and plural learned models 34 are stored in the storage section 22.

The data 32 for learning relating to the present embodiment is described with reference to FIG. 3. As shown in FIG. 3, time series data of data, which corresponds to driving scenes and relates to behaviors of the vehicle that are acquired at a predetermined time interval (hereinafter called "vehicle behavior related data"), are stored in the data 32 for learning. In the present embodiment, the vehicle behavior related data includes the vehicle speed, the amount of operation of the accelerator pedal, the amount of operation of the brake pedal, the steering angle of the steering wheel, the angular velocity of the vehicle, the acceleration in the lateral direction of the vehicle, and the acceleration in the longitudinal direction of the vehicle. Further, the data that is included in the data 32 for learning is only data that is acquired at the time when driving, which has a relatively high evaluation of driving actions, is being carried out. Here, driving that has a relatively high evaluation of driving actions means, for example, driving that satisfies rules of traffic, and driving that does not impede the flow of traffic.

Although the learned models 34 are described in detail later, the learned models 34 are models that have been learned by using the data 32 for learning, and are plural models that correspond to plural driving scenes, respectively.

Figure 4:
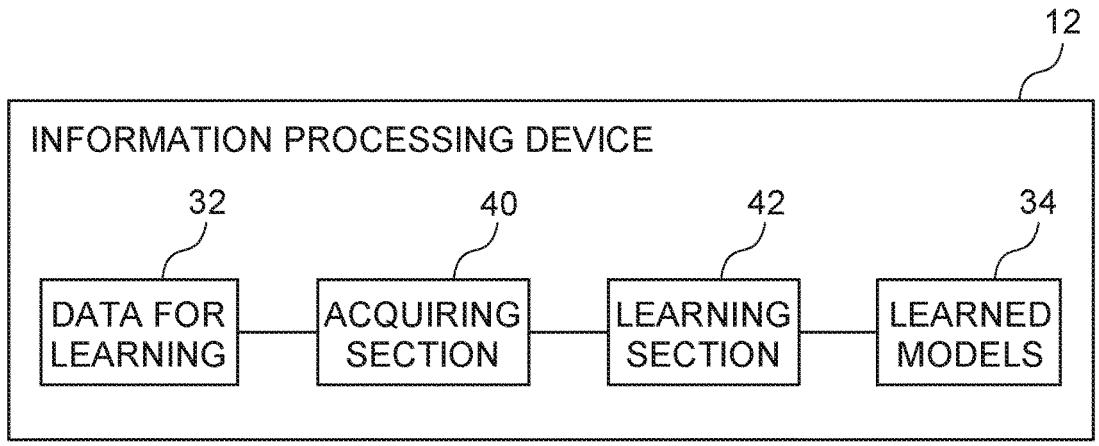
FIG. 4 is a block drawing showing an example of functional structures of the information processing device.

Next, the functional structures of the information processing device 12 relating to the present embodiment are described with reference to FIG. 4. As shown in FIG. 4, the information processing device 12 includes an acquiring section 40 and a learning section 42. The CPU 20 of the information processing device 12 functions as the acquiring section 40 and the learning section 42 that are shown in FIG. 4, due to the CPU 20 of the information processing device 12 executing the learning program 30 that is stored in the storage section 22.

The acquiring section 40 acquires the vehicle behavior related data for each driving scene from the data 32 for learning that are stored in the storage section 22.

The learning section 42 generates the plural learned models 34 that correspond to plural driving scenes respectively, by machine learning models by using the vehicle behavior related data for each driving scene, which is acquired by the acquiring section 40, as training data. Then, the learning section 42 stores the plural learned models that have been generated in the storage section 22. For example, an LSTM (Long Short-Term Memory) auto encoder is used as the learned model 34.

Figure 5:
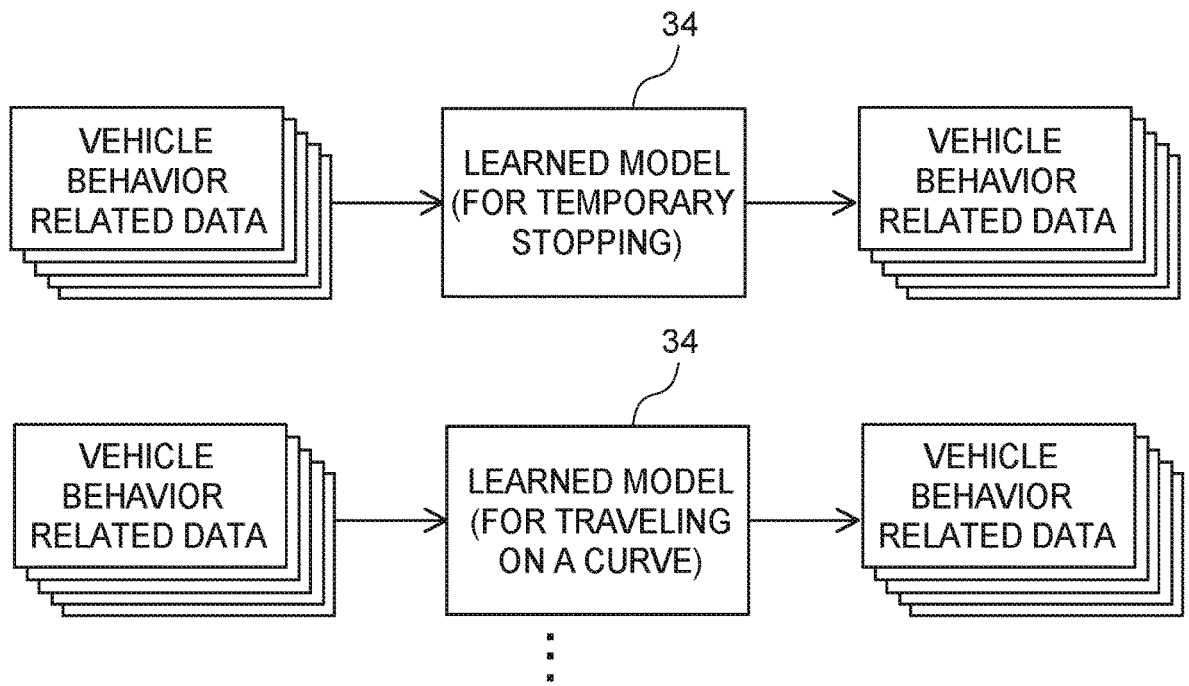
FIG. 5 is a drawing for explaining learned models.

In detail, as shown in FIG. 5 as an example, the learning section 42 generates, for each driving scene, the learned model 34 whose inputs are the time series data of the vehicle behavior related data and whose outputs are time series data of vehicle behavior related data of the same number as the number of inputs. More specifically, the learning section 42 generates the learned model 34 by causing a model to learn such that the time series data of vehicle behavior related data that are the outputs in a case in which time series data of the vehicle behavior related data are the inputs, become equivalent to the time series data of the vehicle behavior related data that are the inputs.

As described above, in the present embodiment, the data that is included in the data 32 for learning is data that is acquired at the time when driving, which has a relatively high evaluation of driving actions (that is, that represents preferred driving actions), is being carried out. Accordingly, the further that driving actions being presently evaluated are removed from driving actions that have received a high evaluation, i.e., the lower the evaluation of the driving actions, the greater the differences between the inputs and the outputs of the learned model 34. Note that the number of the vehicle behavior related data that are the inputs and the outputs of the learned model 34 is not particularly limited, and, for example, a form in which the number is set in advance to 30 items of data or the like is an example. Further, for example, instead of the number of data, a time period may be set in advance such as, for example, time series data of vehicle behavior related data of 30 seconds, or the like.

Figure 6:
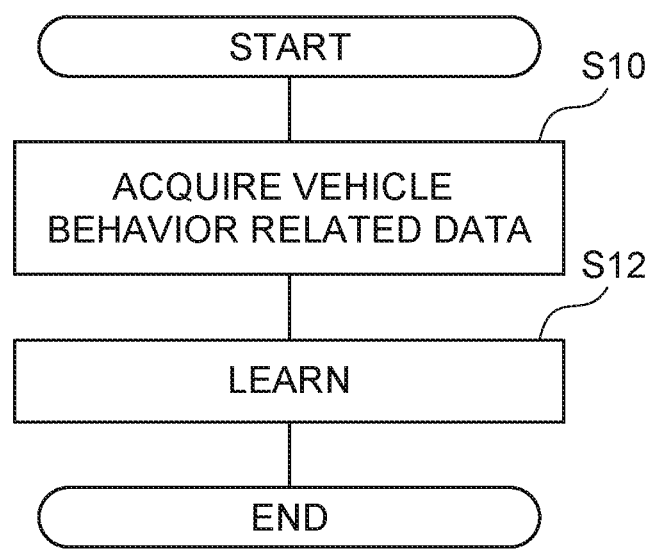
FIG. 6 is a flowchart showing an example of learning processing.

Operation of the information processing device 12 relating to the present embodiment is described next with reference to FIG. 6. Note that FIG. 6 is a flowchart showing an example of the flow of learning processing that is executed by the CPU 20 of the information processing device 12 relating to the present embodiment. The learning processing shown in FIG. 6 is executed due to the CPU 20 executing the learning program 30 that is stored in the storage section 22.

In step S10 of FIG. 6, as described above, the acquiring section 40 acquires, from the data 32 for learning that is stored in the storage section 22, the vehicle behavior related data for each driving scene.

In step S12, as described above, the learning section 42 generates, for the respective driving scenes, the plural learned models 34 that correspond to the plural driving scenes respectively, by machine learning models by using the vehicle behavior related data for each driving scene, which is acquired by the acquiring section 40, as training data. Then, the learning section 42 stores the plural learned models 34 that have been generated in the storage section 22. When the processing of step S12 ends, the learning processing ends.

Figure 7:
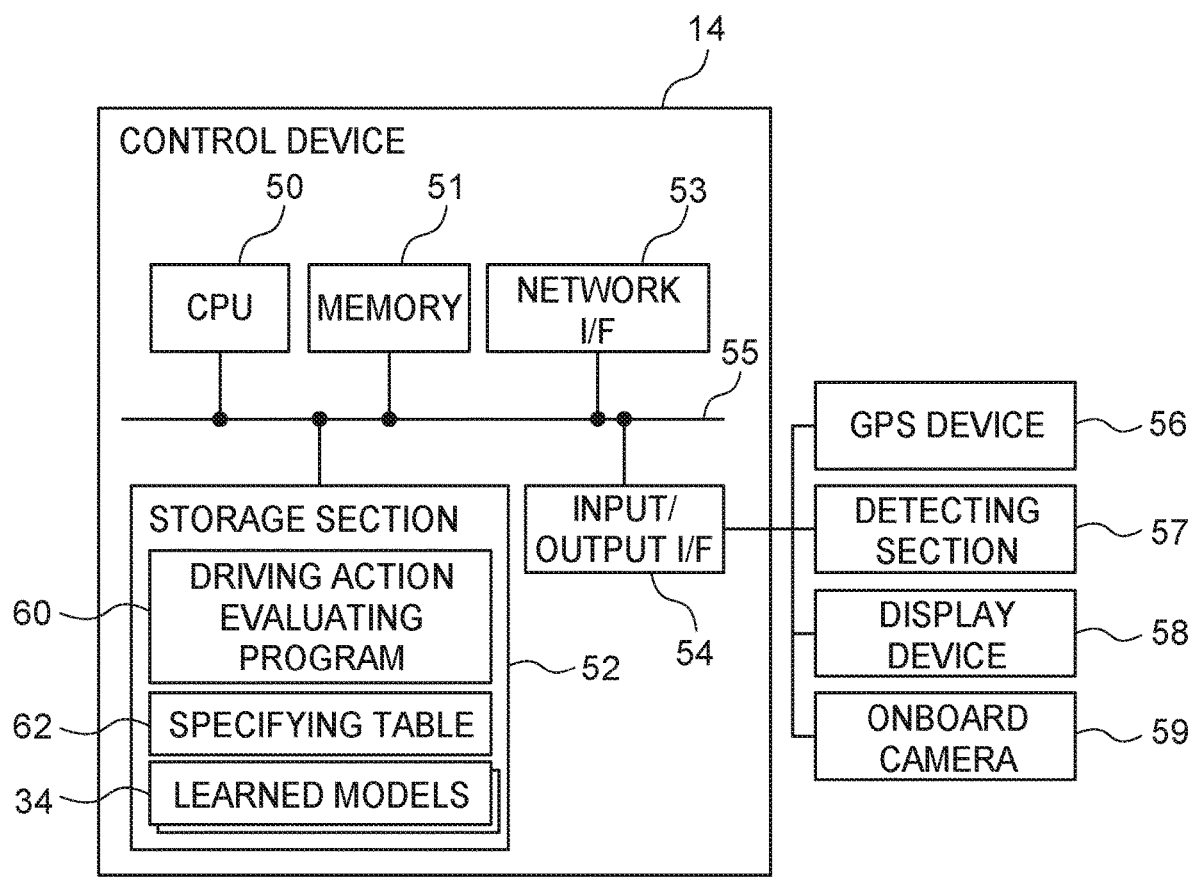
FIG. 7 is a block drawing showing an example of hardware structures of a control device.

Next, the hardware structures of the control device 14 that is installed in the vehicle relating to the present embodiment are described with reference to FIG. 7. As shown in FIG. 7, the control device 14 includes a CPU 50, a memory 51 that serves as a temporarily storage region, and a non-volatile storage section 52. Further, the control device 14 includes a network I/F 53 that is connected to the network N, and an input/output I/F 54. A GPS (Global Positioning System) device 56, a detecting section 57, a display device 58, and an onboard camera 59 are connected to the input/output I/F 54. The CPU 50, the memory 51, the storage section 52, the network I/F 53, and the input/output I/F 54 are connected to a bus 55. The control device 14 is an example of the driving action evaluating device relating to the disclosed technique. An ECU (Electronic Control Unit) is an example of the control device 14.

The storage section 52 is realized by an HDD, an SSD, a flash memory, or the like. A driving action evaluation program 60 is stored in the storage section 52 that serves as a non-transitory storage medium. The CPU 50 reads-out the driving action evaluation program 60 from the storage section 52, and thereafter, expands the driving action evaluation program 60 in the memory 51, and executes the expanded driving action evaluation program 60. Further, the learned models 34 that are generated by the information processing device 12 are stored in the storage section 52. The control device 14 acquires the learned models 34 from the information processing device 12 via the network N for example. Note that, for example, the control device 14 may acquire the learned models 34 from the information processing device 12 via a non-transitory storage medium such as a memory card or the like for example. Further, the time series data of the vehicle behavior related data of the own vehicle, which is detected at a predetermined time interval (e.g., a one-second interval) by the detecting section 57 that is described later, is stored in the storage section 52.

Figure 8:
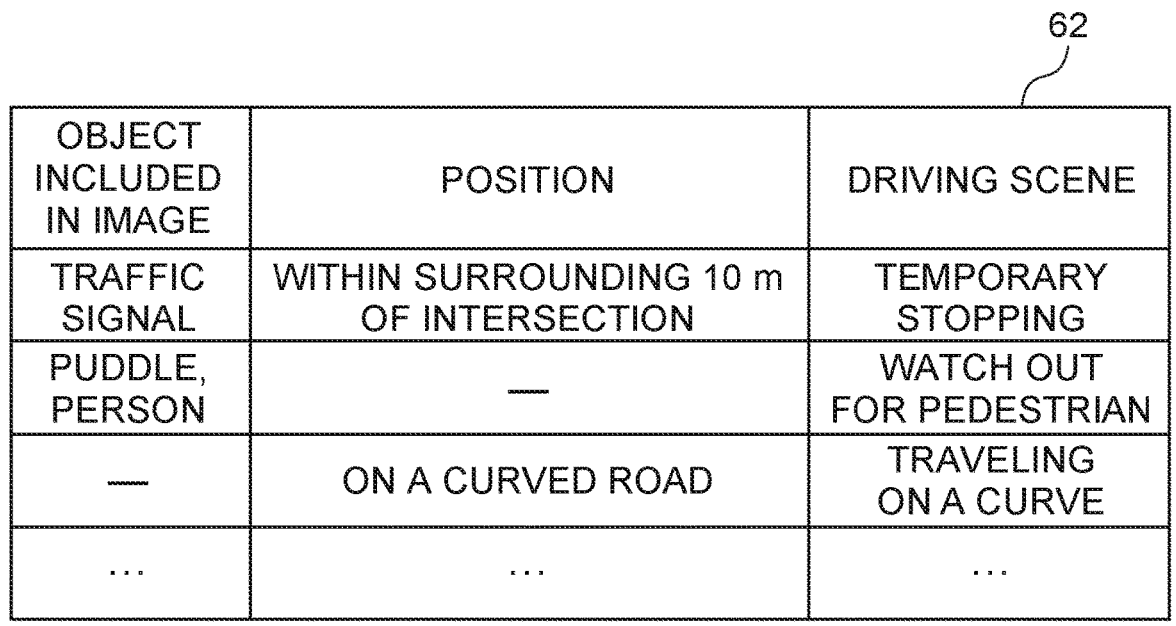
FIG. 8 is a drawing showing an example of a specifying table.

A specifying table 62 that is used in specifying the driving scene is stored in the storage section 52. The specifying table 62 relating to the present embodiment is described with reference to FIG. 8. As shown in FIG. 8, the driving scenes are stored in the specifying table 62 in correspondence with at least one of an object included in an image captured by an onboard camera 59, and the position of the own vehicle. For example, the driving scene called "temporary stopping" is made to correspond to the combination of an object that is included in the image captured by the onboard camera 59 being a traffic signal, and the position of the own vehicle being within the surrounding 10 m of an intersection. Further, for example, the driving scene called "watch out for pedestrian" is made to correspond to a case in which objects that are included in the image captured by the onboard camera 59 are a puddle and a person. As another example, the driving scene called "traveling on a curve" is made to correspond to a case in which the position of the own vehicle is on a curved road. Note that plural driving scenes may be made to correspond to one combination of an object included in an image captured by the onboard camera 59 and the position of the own vehicle.

The GPS device 56 receives GPS signals from plural GPS satellites and measures the position of the own vehicle, and outputs position information, which expresses the measured position of the own vehicle, to the control device 14. The detecting section 57 detects the vehicle behavior related data of the own vehicle, and outputs the detected vehicle behavior related data of the own vehicle to the control device 14. In detail, the detecting section 57 includes a group of sensors that respectively detect the vehicle speed of the own vehicle, the amount of operation of the accelerator pedal, the amount of operation of the brake pedal, the steering angle of the steering wheel, the angular velocity, the acceleration of the vehicle in the lateral direction, and the acceleration of the vehicle in the longitudinal direction.

The display device 58 displays the information that is inputted from the control device 14. The display of a car navigation system is an example of the display device 58. The display device 58 may be the display of a portable information terminal that is connected to the control device 14 by wireless communication. The onboard camera 59 is installed in the vehicle cabin of the own vehicle, and outputs, to the control device 14, image data that is acquired by capturing images of the front of the vehicle.

Figure 9:
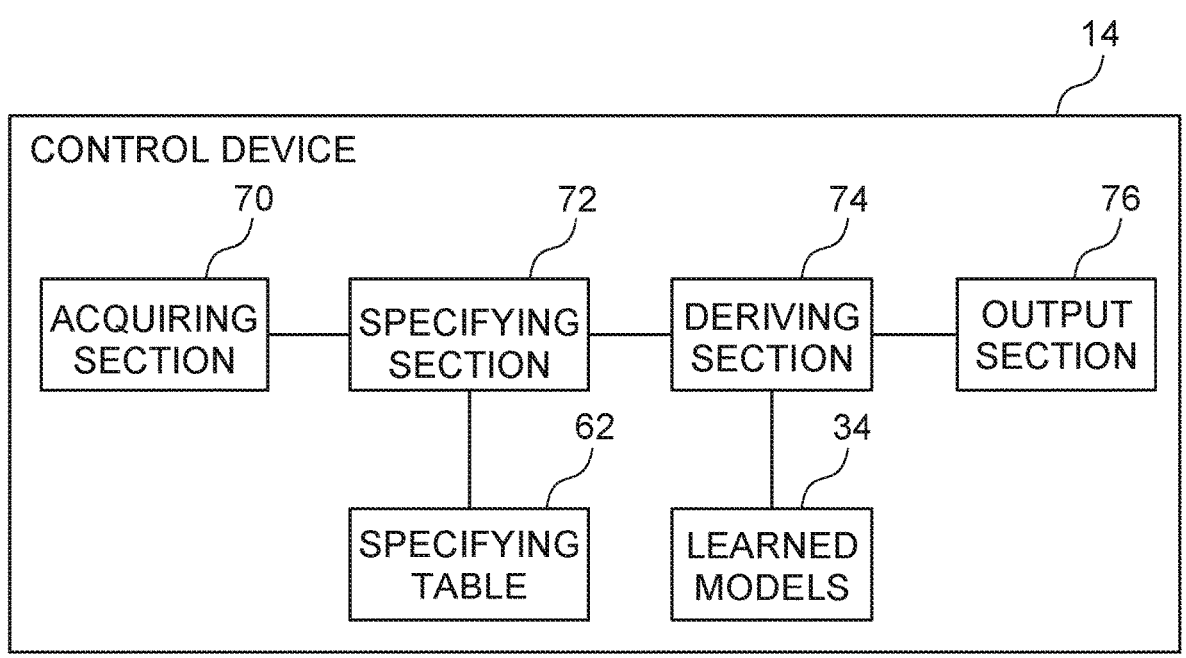
FIG. 9 is a block drawing showing an example of functional structures of the control device.

The functional structures of the control device 14 relating to the present embodiment are described next with reference to FIG. 9. As shown in FIG. 9, the control device 14 includes an acquiring section 70, a specifying section 72, a deriving section 74 and an output section 76. The CPU 50 of the control device 14 functions as the acquiring section 70, the specifying section 72, the deriving section 74 and the output section 76 that are shown in FIG. 9 due to the CPU 50 of the control device 14 executing the driving action evaluation program 60 that is stored in the storage section 52.

The acquiring section 70 acquires, from the onboard camera 59, image data obtained by imaging by the onboard camera 59. Further, the acquiring section 70 acquires, from the GPS device 56, position information that expresses the position of the own vehicle.

The specifying section 72 specifies the driving scene by using at least one of the image expressed by the image data acquired by the acquiring section 70, and position information of the own vehicle. In detail, due to the specifying section 72 carrying out a known object detecting processing on the image data acquired by the acquiring section 70, the specifying section 72 detects objects that are included in the image expressed by the image data acquired by the acquiring section 70. Examples of this object detecting processing are Faster R-CNN (Regions with Convolutional Neural Networks), YOLO (You Only Look Once), SSD (Single Shot Multibox Detector), and the like.

The specifying section 72 specifies what kind of position on the road is the position which is expressed by the position information acquired by the acquiring section 70. This specifying can be carried out by, for example, using the position of the own vehicle and map information, with the map information including information that corresponds to the position information and relates to the roads such as intersections and curves and the like.

Further, the specifying section 72 refers to the specifying table 62 and specifies, as the driving scene of the own vehicle, a driving scene that corresponds to a combination of a specified object and a position, or a driving scene that corresponds to only a specified object, or a driving scene that corresponds to only a specified position. In the present embodiment, the specifying section 72 carries out specifying of the above-described driving scene each predetermined first time period (e.g., 10 seconds). Note that the specifying section 72 may specify the driving scene of the own vehicle by using learned models that are obtained in advance by machine learning that uses training data, and whose inputs are images expressed by image data and the position information of the vehicle, and whose outputs are the driving scenes.

The deriving section 74 derives an evaluation of the driving actions by executing an evaluation logic, which corresponds to only the driving scene specified by the specifying section 72, among plural evaluation logics that correspond to plural driving scenes, respectively. In detail, the deriving section 74 inputs time series data of the most recent vehicle behavior related data of the own vehicle to, among the plural learned models 34 that are stored in the storage section 52, the learned model 34 that corresponds to only the driving scene that is specified by the specifying section 72. In correspondence with this input, time series data of vehicle behavior related data, which are of the same number as the number of inputs, are outputted from the learned model 34.

The deriving section 74 derives, as the evaluation of the driving actions, the difference between the time series data of the vehicle behavior related data outputted from the learned model 34, and the time series data of the vehicle behavior related data inputted to the learned model 34. As described above, in the present embodiment, the smaller this difference, the higher the evaluation of the driving actions. For example, the Mahalanobis distance can be used as this difference. In the present embodiment, the deriving section 74 carries out the above-described evaluation of the driving actions each second time period (e.g., one second) that is shorter than the first time period. Namely, each one time that the specifying section 72 specifies the driving scene, the deriving section 74 derives the evaluation of the driving actions plural times. Note that the deriving section 74 may convert the derived evaluations into evaluation values of a number of levels that is set in advance, such as 10 levels of evaluation or the like.

A logic, which is executed by the above-described deriving section 74 and which evaluates the driving actions by using the learned model 34, corresponds to the evaluation logic relating to the disclosed technique.

The output section 76 outputs the evaluation that is derived by the deriving section 74. In detail, the output section 76 informs the driver of the own vehicle by outputting, to the display device 58, the evaluation that is derived by the deriving section 74. For example, in a case in which the evaluation derived by the deriving section 74 does not satisfy a predetermined standard, i.e., in a case in which the evaluation is a predetermined threshold value or greater, the output section 76 may warn the driver of the own vehicle by outputting, to the display device 58, a message that urges safe driving. Further, the output section 76 may notify the driver of the own vehicle by a voice, by outputting the evaluation derived by the deriving section 74 to a voice outputting device such as a speaker or the like that is installed in the vehicle.

Note that the output section 76 may transmit the evaluation derived by the deriving section 74 to the information processing device 12 via the network N. In this case, the information processing device 12 accumulates the evaluations of the driving actions that are transmitted periodically from respectively vehicles. Further, in this case, the information processing device 12, at a periodic timing such as once a month or the like for example, totals the evaluations that have been accumulated per vehicle, and informs the owner of the vehicle of the totaled results by email or the like. Further, the evaluations of the driving actions of the respective vehicles may be used in computing insurance fees or the like for example.

Figure 10:
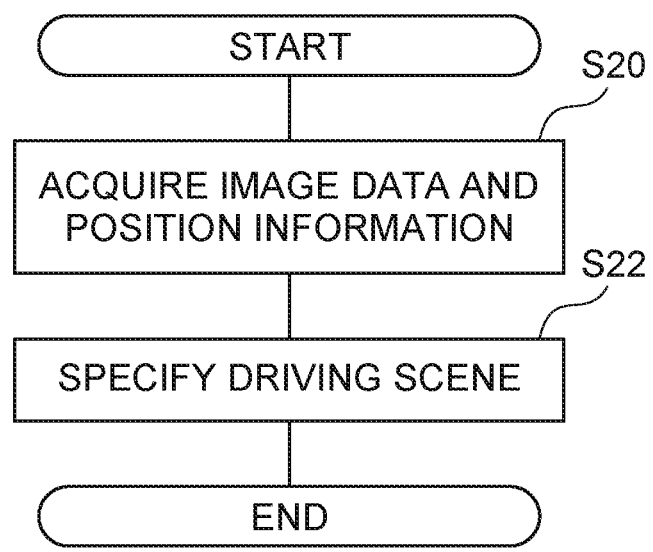
FIG. 10 is a flowchart showing an example of driving scene specifying processing.
Figure 11:
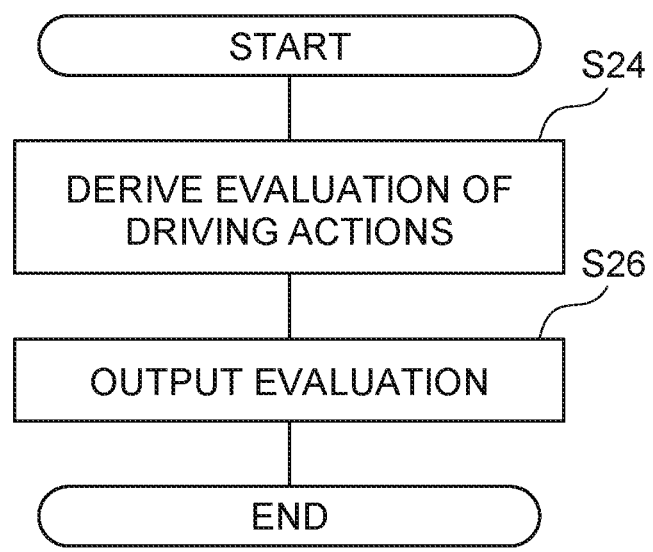
FIG. 11 is a flowchart showing an example of driving action evaluating processing.

Operation of the control device 14 relating to the present embodiment is described next with reference to FIG. 10 and FIG. 11. Note that FIG. 10 is a flowchart showing an example of the flow of driving scene specifying processing that is executed by the CPU 50 of the control device 14 relating to the present embodiment. Further, FIG. 11 is a flowchart showing an example of the flow of driving action evaluating processing that is executed by the CPU 50 of the control device 14 relating to the present embodiment. The driving scene specifying processing shown in FIG. 10 and the driving action evaluating processing shown in FIG. 11 are executed due to the CPU 50 executing the driving action evaluation program 60 that is stored in the storage section 52. The driving scene specifying processing that is shown in FIG. 10 is executed each aforementioned first time period. The driving action evaluating processing that is shown in FIG. 11 is executed each aforementioned second time period.

In step S20 of FIG. 10, the acquiring section 70 acquires, from the onboard camera 59, image data obtained by imaging by the onboard camera 59. Further, the acquiring section 70 acquires, from the GPS device 56, position information that expresses the position of the own vehicle.

In step S22, as described above, the specifying section 72 specifies the driving scene by using at least one of the image expressed by the image data and the position information of the own vehicle that were acquired in step S20. When the processing of step S22 ends, the driving scene specifying processing shown in FIG. 10 ends.

In step S24 of FIG. 11, as described above, the deriving section 74 derives an evaluation of the driving actions by executing an evaluation logic, which corresponds to only the driving scene specified in the immediately previous step S22, among plural evaluation logics that correspond to plural driving scenes, respectively.

In step S26, as described above, the output section 76 notifies the driver of the own vehicle by outputting the evaluation results, which were derived in step S24, to the display device 58. When the processing of step S26 ends, the driving action evaluating processing shown in FIG. 11 ends.

As described above, in accordance with the present embodiment, an evaluation of the driving actions is derived by the execution of an evaluation logic, which corresponds to only the specified driving scene, among plural evaluation logics that correspond to plural driving scenes, respectively. Accordingly, there is no need for division into various scenes, and further, the amount of computation can be reduced because only the evaluation logic that corresponds to a specific driving scene is executed. As a result, evaluation of the driving actions of the vehicle can be carried out efficiently in various driving scenes.

Note that the information processing device 12 may have at least some of the functional sections that the control device 14 has in the above-described embodiment. In this case, a form in which the information processing device 12 has the functions of the specifying section 72 and the deriving section 74 is an example. In this case, the learned models 34 and the specifying table 62 are stored in the storage section 52 of the information processing device 12. Further, the control device 14 transmits, to the information processing device 12, the image data expressing the image acquired by the onboard camera 59, and the position information expressing the position of the own vehicle measured by the GPS device 56. In the same way as the control device 14 relating to the above-described embodiment, the information processing device 12 specifies the driving scene by using at least one of the image expressed by the image data and the position information of the vehicle, which are transmitted from the control device 14. Further, the information processing device 12 derives the evaluation of the driving actions by executing the evaluation logic, which corresponds to only the specified driving scene, among the plural evaluation logics that correspond to plural driving scenes, respectively.

Further, although description has been given in which the processings carried out by the CPUs 20, 50 in the above-described embodiment are software processings that are carried out by executing programs, they may be processings that are carried out by hardware such as ASICs (Application Specific Integrated Circuits) and FPGAs (Field-Programmable Gate Arrays) and the like. Further, the processings carried out by the CPUs 20, 50 may be processings that are carried out by combining both software and hardware. Moreover, the learning program 30 that is stored in the storage section 22 and the driving action evaluation program 60 that is stored in the storage section 52 may be stored on any of various types of non-transitory storage media and distributed.

The present disclosure is not limited to the above-described embodiment, and, in addition to the above-described embodiment, can be implemented by being modified in various ways within a scope that does not depart from the gist thereof

What is claimed is:
1. A driving action evaluating device for a vehicle, the driving action evaluating device comprising:
a memory; and
a processor that is connected to the memory and that is configured to:
specify a driving scene reflecting current circumstances of the vehicle, the specification based on at least one of:
an image captured by an onboard camera of the vehicle, and
position information of the vehicle; and
derive an evaluation of driving actions by executing an evaluation logic corresponding to the specified driving scene, the evaluation logic being one of a plurality of evaluation logics that respectively correspond to a plurality of driving scenes, each of the plurality of evaluation logics having a corresponding learned model trained in advance, the inputs and outputs of each learned model being data relating to behavior of vehicles, the execution of the evaluation logic including:
inputting, to the corresponding learned model, an inputted time series of data relating to recent behavior of the vehicle,
receiving an outputted time series of data relating to preferred behavior of the vehicle in the specified driving scene, the outputted time series being outputted from the corresponding learned model responsive to input of the inputted time series, and evaluating the driving actions based at least in part on a comparison of the outputted time series and the inputted time series,
wherein the driving scene is specified once every first period of a predetermined first length, and the evaluation of driving actions is derived once every second period of a second length shorter than the first length.

2. The driving action evaluating device of claim 1, wherein the evaluation logic provides an evaluation value of the driving actions which corresponds to a difference between the outputted time series and the inputted time series.

3. The driving action evaluating device of claim 2, wherein the processor is further configured, responsive to a comparison of the evaluation value with a predetermined threshold, to signal a drive assist system coupled to the driving action evaluating device to engage a drive assist mode.

4. The driving action evaluating device of claim 1, wherein the data relating to the behavior of vehicles includes a vehicle speed, an amount of operation of an accelerator pedal, an amount of operation of a brake pedal, a steering angle of a steering wheel, an angular velocity of the vehicle, an acceleration of the vehicle in a lateral direction, and an acceleration of the vehicle in a longitudinal direction.

5. A driving action evaluating method for a vehicle, the driving action evaluating method comprising: by a processor,
specifying a driving scene reflecting current circumstances of the vehicle, the specification based on at least one of:
an image captured by an onboard camera of the vehicle, and
position information of the vehicle; and
deriving an evaluation of driving actions by executing an evaluation logic corresponding to the specified driving scene, the evaluation logic being one of a plurality of evaluation logics that respectively correspond to a plurality of driving scenes, each of the plurality of evaluation logics having a corresponding learned model trained in advance, the inputs and outputs of each learned model being data relating to behavior of vehicles, the execution of the evaluation logic including:
inputting, to the corresponding learned model, an inputted time series of data relating to recent behavior of the vehicle,
receiving an outputted time series of data relating to preferred behavior of the vehicle in the specified driving scene, the outputted time series being outputted from the corresponding learned model responsive to input of the inputted time series, and
evaluating the driving actions based at least in part on a comparison of the outputted time series and the inputted time series,
wherein the driving scene is specified once every first period of a predetermined first length, and the evaluation of driving actions is derived once every second period of a second length shorter than the first length.

6. The driving action evaluating method of claim 5, wherein the evaluation logic provides an evaluation value of the driving actions which corresponds to a difference between the outputted time series and the inputted time series.

7. The driving action evaluating method of claim 6, further comprising, responsive to a comparison of the evaluation value with a predetermined threshold, signaling a drive assist system coupled to the driving action evaluating device to engage a drive assist mode.

8. The driving action evaluating method of claim 5, wherein the data relating to the behavior of vehicles includes a vehicle speed, an amount of operation of an accelerator pedal, an amount of operation of a brake pedal, a steering angle of a steering wheel, an angular velocity of the vehicle, an acceleration of the vehicle in a lateral direction, and an acceleration of the vehicle in a longitudinal direction.

9. A non-transitory recording medium storing a program that is executable by a computer to perform a processing, the processing comprising:
specifying a driving scene reflecting current circumstances of the vehicle, the specification based on at least one of:
an image captured by an onboard camera of the vehicle, and
position information of the vehicle; and
deriving an evaluation of driving actions by executing an evaluation logic corresponding to the specified driving scene, the evaluation logic being one of a plurality of evaluation logics that respectively correspond to a plurality of driving scenes, each of the plurality of evaluation logics having a corresponding learned model trained in advance, the inputs and outputs of each learned model being data relating to behavior of vehicles, the execution of the evaluation logic including:
inputting, to the corresponding learned model, an inputted time series of data relating to recent behavior of the vehicle,
receiving an outputted time series of data relating to preferred behavior of the vehicle in the specified driving scene, the outputted time series being outputted from the corresponding learned model responsive to input of the inputted time series, and
evaluating the driving actions based at least in part on a comparison of the outputted time series and the inputted time series,
wherein the driving scene is specified once every first period of a predetermined first length, and the evaluation of driving actions is derived once every second period of a second length shorter than the first length.

10. The non-transitory recording medium of claim 9, wherein the evaluation logic provides an evaluation value of the driving actions which corresponds to a difference between the outputted time series and the inputted time series.

11. The non-transitory recording medium of claim 10, wherein the processing further comprises, responsive to a comparison of the evaluation value with a predetermined threshold, signaling a drive assist system coupled to the driving action evaluating device to engage a drive assist mode.

12. The non-transitory recording medium of claim 9, wherein the data relating to the behavior of vehicles includes a vehicle speed, an amount of operation of an accelerator pedal, an amount of operation of a brake pedal, a steering angle of a steering wheel, an angular velocity of the vehicle, an acceleration of the vehicle in a lateral direction, and an acceleration of the vehicle in a longitudinal direction.

* * * * *